(12) United States Patent
Yeh et al.

(10) Patent No.: US 7,478,048 B2
(45) Date of Patent: Jan. 13, 2009

(54) METHOD AND SYSTEM FOR AUTOMATICALLY CREATING VOICE XML FILE

(75) Inventors: James Tien-Cheng Yeh, Beijing (CN); Hiu Su, Beijing (CN); Qianying Wang, Stanford, CA (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 10/629,131

(22) Filed: Jul. 29, 2003

(65) Prior Publication Data

US 2004/0093217 A1 May 13, 2004

(30) Foreign Application Priority Data

Feb. 2, 2001 (WO) .................... PCT/GB02/00341

(51) Int. Cl.
*G10L 21/00* (2006.01)
(52) U.S. Cl. .................... 704/270.1; 715/208; 715/205; 715/239
(58) Field of Classification Search ............. 704/270.1, 704/270, 272, 275, 258, 257, 131, 246, 251, 704/1, 9; 715/208, 239, 205
See application file for complete search history.

(56) References Cited

U.S. PATENT DOCUMENTS 7,143,042 B1 * 11/2006 Sinai et al. ............... 704/270.1
7,210,098 B2 * 4/2007 Sibal et al. ................. 715/205

FOREIGN PATENT DOCUMENTS

| JP | PUPA 11-161465 | 6/1999 |
| JP | PUPA 2001-255881 | 9/2001 |
| JP | PUPA 2001-282503 | 10/2001 |
| JP | PUPA 2001-296991 | 10/2001 |

* cited by examiner

*Primary Examiner*—Huyen X. Vo
(74) *Attorney, Agent, or Firm*—Anne Vachon Dougherty (57) ABSTRACT

This invention discloses a system for creating voice XML file automatically, comprising: a graphic user interface for defining a plurality of icons, wherein each of said icons corresponds to one or more attributes of voice XML; voice XML tag generator for interpreting said action stream based on a library of voice XML tags, generating the corresponding voice XML tags; and, voice XML file generator for combing the contents to be played with the tags generated by the voice XML tag generator according voice XML syntax, for creating the voice XML file. This system can create the voice XML file for the TTS voice XML file or the real-time-recorded audio voice XML file.

18 Claims, 8 Drawing Sheets

METHOD AND SYSTEM FOR AUTOMATICALLY CREATING VOICE XML FILE

FIELD OF THE INVENTION

The present invention generally relates to how to automatically create HTML (Hypertext Markup Language) files which can be used to broadcast message on the WWW (World wide Web) for network users, and more particularly to how to automatically create voice XML (voice XML) files which can be used to broadcast voice messages on the WWW for network users.

BACKGROUND OF THE INVENTION

Various browsers popularly used, such as the Netscape Navigator, have become effective tools for network users to access the WWW. These browsers are textual and graphic user interfaces which aid network users in requesting and displaying information from the WWW. Besides text and graphics, information displayed by a browser may also include sound and hyperlinks and the like, thus the files displayed by a browser are often referred to as hypertext. If hypertext is used when conveying text information in a computer, not only is the linear construction of the information reserved, but also linking construction is added, whereby the hypertext allows users to jump-read text information, thereby facilitating users reading.

With the PvC devices becoming more and more popular, people are becoming unsatisfied with browsing network information only by way of reading, and audio broadcasting has become one of the major ways to browse network information for mobile users. However, browsing an audio file is not so easy as browsing a text file. The lack of interactive method is one of the main barriers. Under such a situation, users can only listen to broadcasted information passively. And there is no way for a user to select information or find more detailed information when he/she listens to an interesting topic just as they are browsing the HTML files on network. Based on speech recognition technology, the technology to select information or find more detailed information based on dialog/conversation is being developed. Voice XML is designed for this usage. However, it is not easy for an ordinary network user to write a voice XML file, which requires the user to have a good command of a large numbers of rules, syntax, and definitions of tags.

It is, accordingly, an object of the present invention to provide a method and system for automatically creating voice XML file.

SUMMARY OF THE INVENTION

A method for automatically creating voice XML file in accordance with one aspect of the present invention comprises the steps of: providing a graphic user interface for defining a multiple of icons, wherein each of the icons corresponds to one or more attributes of voice XML; recording the action stream of users invoking the icons in the graphic user interface; and interpreting the action stream based on a library of voice XML tags for creating the voice XML file.

A program storage device readable by machine and tangibly embodying a program of instructions executable by said machine is provided for causing the machine to perform the foregoing method steps for automatically creating a voice XML file.

A system for automatically creating voice XML file in accordance with another aspect of the present invention comprises: a graphic user interface for defining a multiple of icons, wherein each of the icons corresponds to one or more attributes of voice XML; voice XML tag generator for interpreting the action stream of a user based on a library of voice XML tags and generating the corresponding voice XML tags; and voice XML file generator 103 for combining the contents to be played with the tags generated by the voice XML tag generator according to voice XML syntax for creating the voice XML file.

BRIEF DESCRIPTION OF THE DRAWINGS

These and other advantages and features of the present invention will become more clear from the description in conjunction with the accompanying drawings.

DETAILED DESCRIPTION OF THE INVENTION

Figure 1:
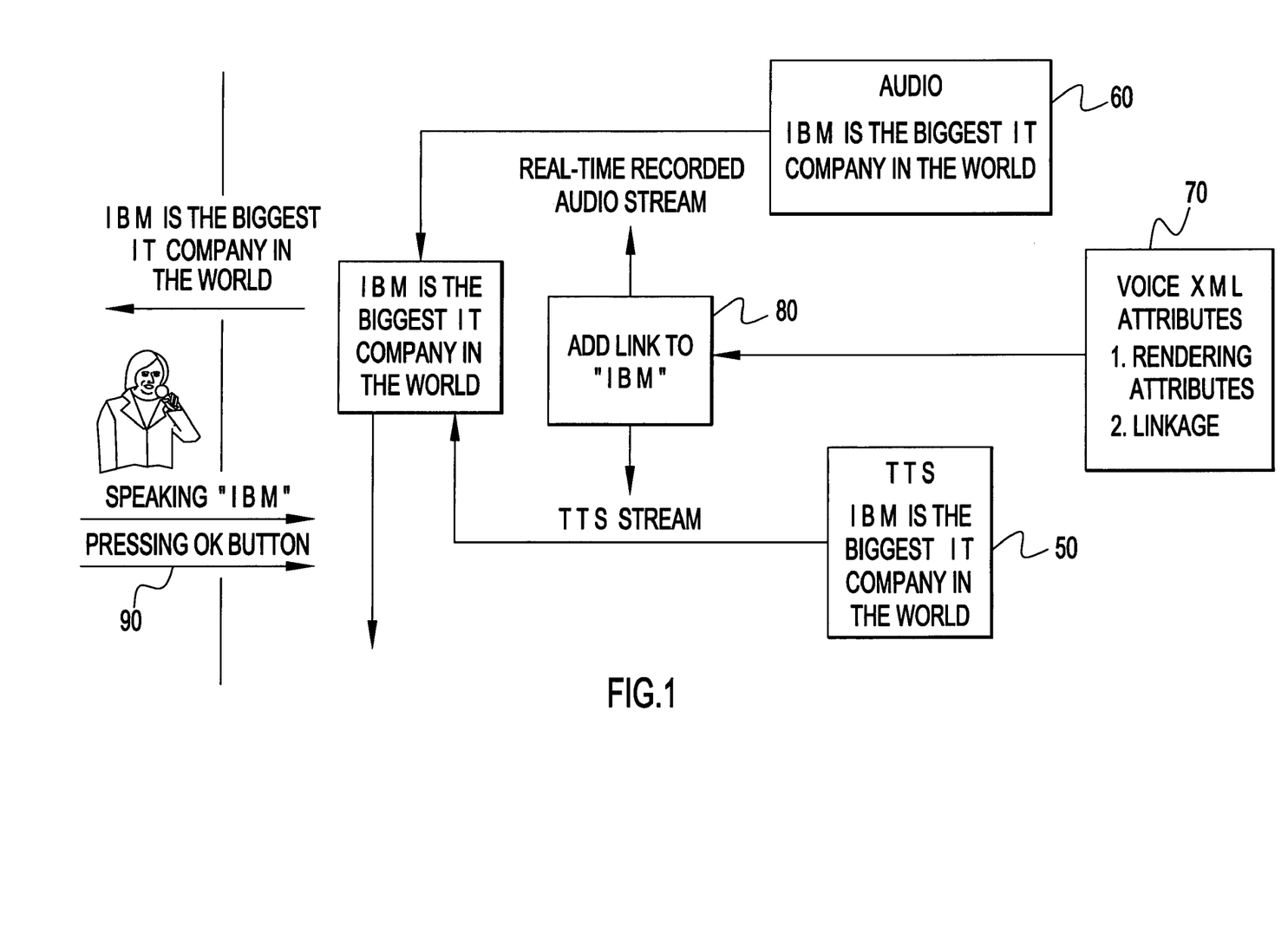
FIG. 1 shows how to add hyperlinks to a piece of audio and how a user interacts with the hyperlinks.

FIG. 1 describes how to add hyperlinks to a piece of audio and how a user interacts with the hyperlinks. As shown in FIG. 1, for a sentence "IBM is the biggest IT company in the world" to be played, it can be formed as a conventional TTS (text-to-speech) stream 50 or as a real-time-recorded audio stream 60. To facilitate the user to obtain relevant detailed information on IBM, some attributes 70 can be added, such as a speech rendering attribute and a linking attribute. As a result, when playing the above-mentioned sentence, the audio browser can place emphasis on IBM in a different tone (or other attributes) so as to draw attention of the user. In the course of playing, when the user selects IBM in DTMF tone or in other ways at 90, the audio browser retrieves the files at the address associated with the hyperlink at 80 and plays further information on IBM for the user. Thus, the user is not just listening to broadcasted information passively. When the user listens to an interesting topic, he/she may select information or obtain further information, just like browsing the HTML files on the Internet. With the development of speech recognition technologies, a user can not only select hypertext by DTMF tone, but can also speak the hyperlink to be selected using the audio browser which has a barge-in voice recognition engine.

In spite of the advantages of voice XML as above mentioned, it is not easy for an ordinary network user to write a voice XML file, which requires the user to have a good command of a large numbers of rules, syntax, and definitions of tags. Accordingly, the present invention provides a method, program storage device readable to machine to implement the method, and system for automatically creating a voice XML file.

Figure 2:
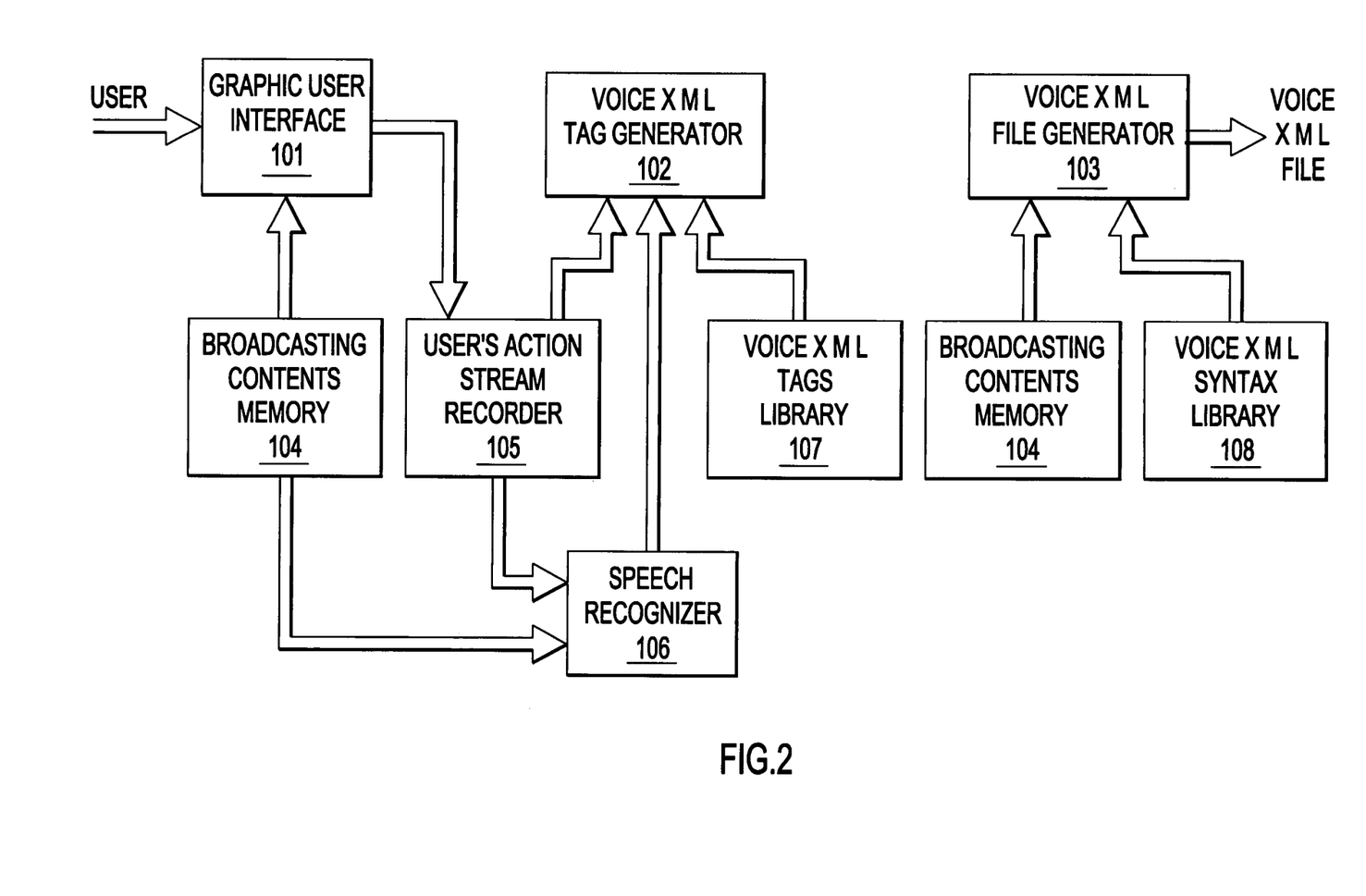
FIG. 2 is a block diagram of a system for automatically creating voice XML file according to one preferred embodiment of the present invention.

FIG. 2 is a block diagram of a system for automatically creating a voice XML file according to one preferred embodiment of the present invention. As shown in FIG. 2, the system comprise: a graphic user interface 101 for defining a plurality of icons, wherein each of the icons corresponds to one or more attributes of voice XML; a voice XML tag generator 102 for interpreting the action stream based on a library of voice XML tags, generating the corresponding voice XML tags; and a voice XML file generator 103 for combining the contents to be played with the tags generated by the voice XML tag generator according to voice XML syntax for creating the voice XML file. According to one preferred embodiment of the present invention, the system may further comprise: a memory 104 for storing the contents to be played; a recorder 105 for recording the action stream of the user; speech recognizer 106; a voice XML tags library 107; a voice XML syntax library 108. When using the system to create a voice XML file for a block of TTS stream, the user firstly interacts with the graphic user interface of the system. For a block of TTS voice XML prompt, a user can edit the TTS stream in the editing area of the graphic user interface, marking or entering the parts needed to be added with the hyperlinks, and invoking the corresponding icons.

Figure 3:
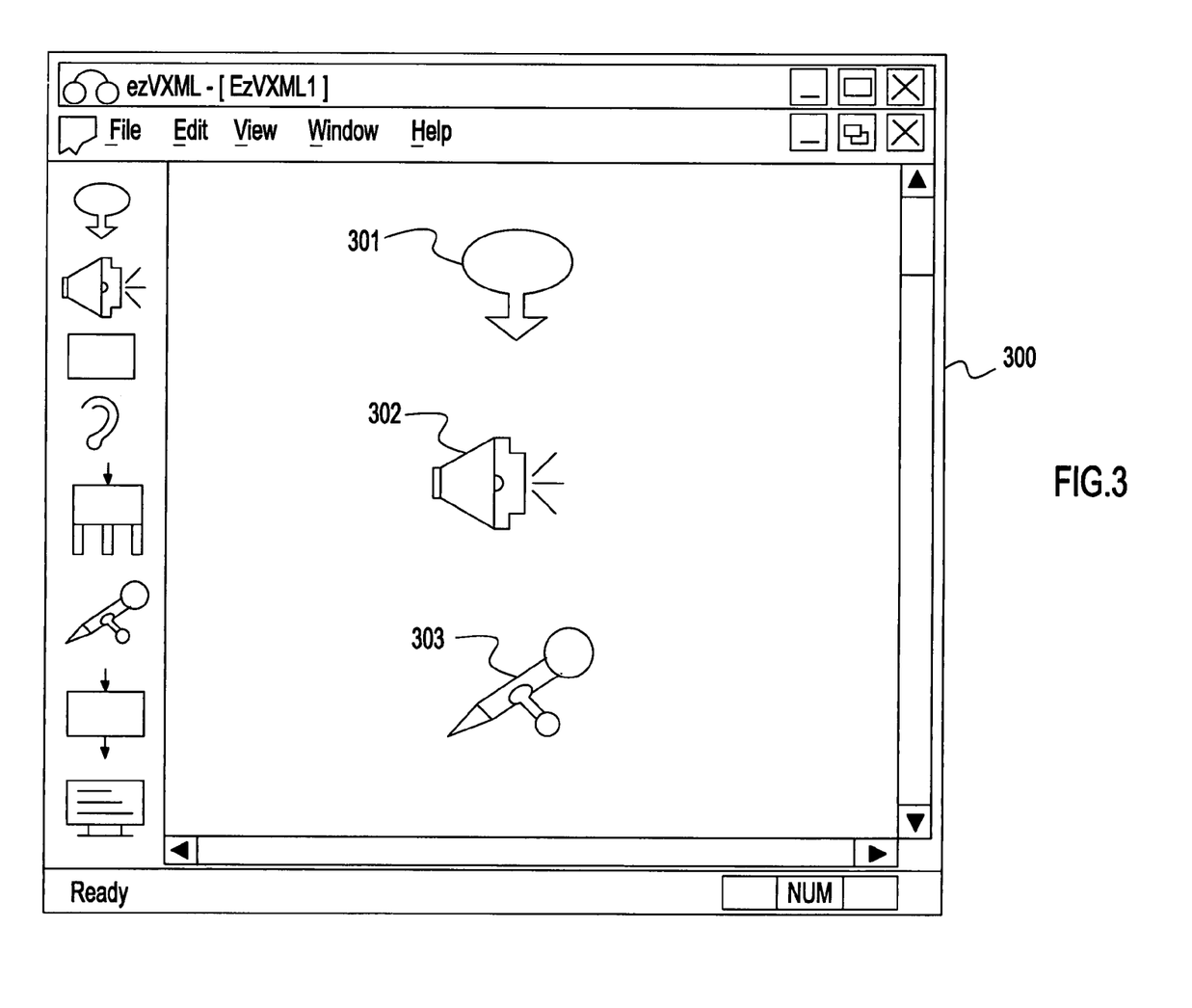
FIG. 3 shows a graphic user interface according to one preferred embodiment of the present invention.

FIG. 3 shows a graphic user interface 300 according to one preferred embodiment of the present invention. The icons 301-303 may correspond to one or more attributes of voice XML, such as:

Speech rendering attributes, including gender, tone and speed of the broadcaster, etc.;

Pointing functions such as realized by Barge-in functions; Hyperlinks, etc.

The action stream recorder 105 of the system records the user's action stream, i.e., the procedure of users invoking the icons in the graphic user interface. Then, voice XML tag generator 102 interprets the action stream of the user based on the voice XML tags library 107, generating a corresponding voice XML tag. The voice XML file generator combines the contents to be played with the voice XML tags generated according to voice XML syntax so as to create the voice XML file.

When using the system to create voice XML for a block of real-time-recorded audio streams, a user also first interacts with the graphic user interface of the system. In the editing area of the graphic user interface, real-time-recorded audio stream is edited; parts to be added with the voice XML attributes are marked and entered; and the corresponding icons are called. For the real-time-recorded audio stream, when the user enters the parts needed to be added with hyperlinks in the editing area, voice XML tag generator 102 of the system activates the speech recognizer 106 while interpreting the user's action stream for finding the parts that match the parts entered by the user in the real-time-recorded audio stream, so as to add voice XML attributes to the corresponding parts of the real-time-recorded audio stream. Examples in which the system automatically creates voice XML file for TTS streams and real-time-recorded audio streams are given below.

EXAMPLE 1

```
<voice XML>
<prompt bargein=true><render.echo>IBM</render.echo>is the
biggest IT company in the world</prompt>
<link next=http://www.ibm.com/vxml/mail.vxml>
<grammar>IBM</grammar>
<dtmf>1</dtmf>
    </link>
    </VXML>
```

EXAMPLE 2

```
</VXML>
<prompt bargein=true><audio src=ibmwelcome.wav></prompt>
<link next=http://www.ibm.com/vxml/mail.vxml>
<grammar>IBM</grammar>
<dtmf>1</dtmf>
    </link>
    </VXML>
```

In addition, when a user marks or enters the same parts needed to be added with the attributes of voice XML in the editing area of the graphic user interface for many times and the designated voice XML attributes are identical, or when a user marks or enters the parts needed to be added with the voice XML attributes in the editing area of the graphic user interface and has designated the attributes of voice XML, after the batch mode is selected, the voice XML file generator of the system processes all of the stored TTS stream or all of the real-time-recorded audio stream, adding the attributes of voice XML designated by the tag generator according to the user's invoking of the icons to the parts that match the marked or entered parts needed to be added with the attributes of voice XML respectively, so that the efficiency of automatically creating voice XML file by the system will be improved greatly.

Figure 4:
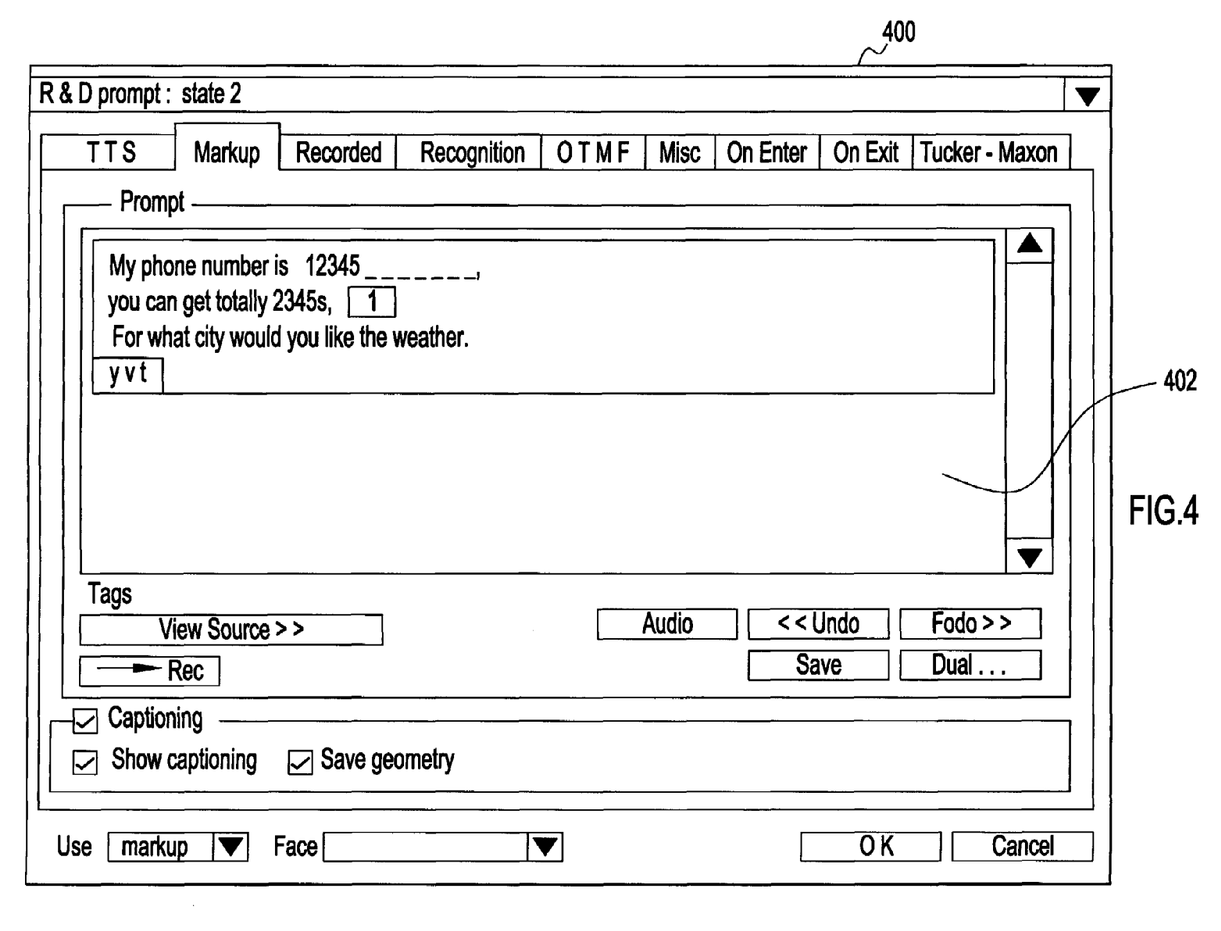
FIG. 4 shows a graphic user interface according to another preferred embodiment of the present invention.

The above has described how to create a voice XML file using the system shown in FIG. 2. Briefly speaking, that is how to add various attributes of voice XML to a TTS stream and a real-time-recorded audio stream. In the various attributes of voice XML, one attribute is of significant importance: hyperlink. As above-mentioned, if hypertext(hyperlink) is used when conveying text information in a computer, not only is the linear construction of the information reserved, but also a linking construction is added, which makes it possible for a reader to read text information in a jumping manner, thus facilitating user's reading. Similarly, after hyperlinks are added to a TTS stream or a real-time-recorded audio stream, a network user can select information or find more detailed information when he/she listens to voice XML files, just as if they are browsing the HTML files. Therefore, based on the system for automatically creating a voice XML file according to one preferred embodiment of the present invention, as shown in FIG. 4, a graphic user interface page 402 for adding hyperlinks to a voice XML file is provided in the graphic user interface 400. In the graphic user interface, the system automatically adds hyperlinks to a TTS stream or a real-time-recorded audio stream when a user marks or enters corresponding parts needed to be added with the hyperlinks and enters the corresponding hyperlink addresses.

Figure 5:
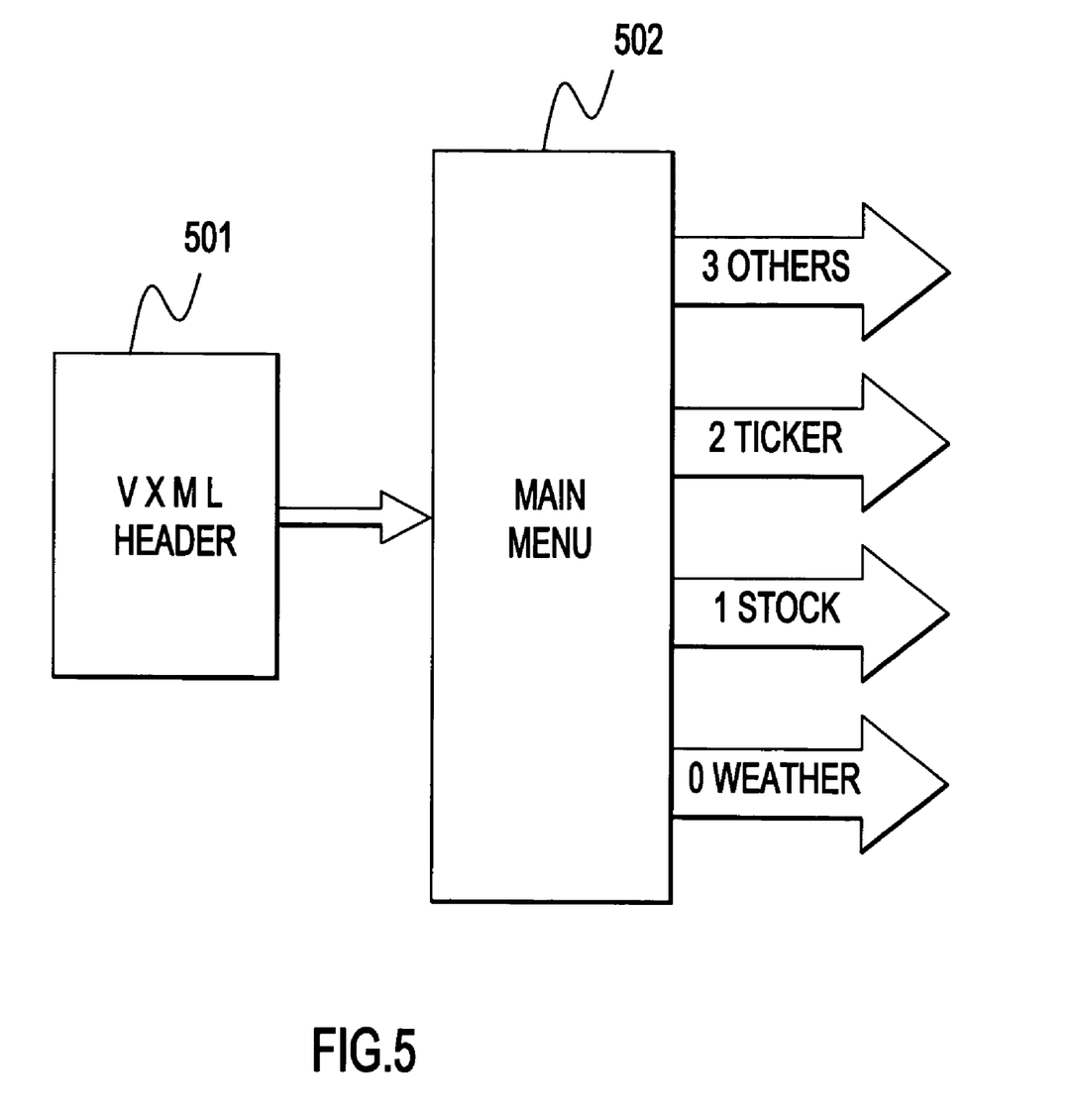
FIG. 5 and FIG. 6 show an action stream for automatically creating voice XML file using the system shown in FIG. 2 according to one preferred embodiment of the present invention.
Figure 6:
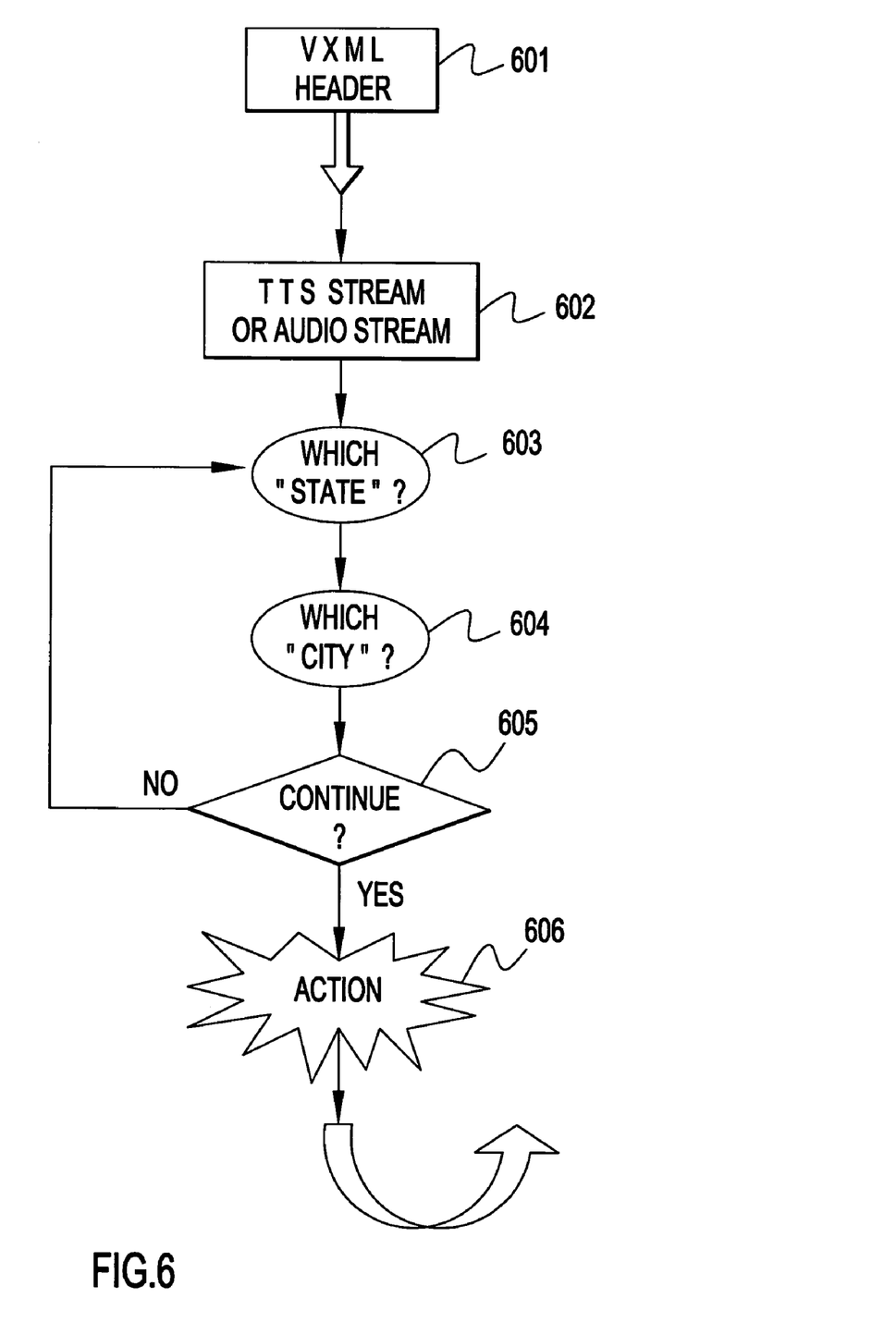

FIG. 5 and FIG. 6 show the action stream that automatically creates a voice XML file using the system as shown in FIG. 2 according to one preferred embodiment of the present invention. As shown in FIG. 5, since the voice XML header has to be generated first, a user invokes the corresponding icon 501 that matches the attributes of the header in the graphic user interface (such as the first icon from the left in FIG. 3). Then the user invokes the icon for the system to broadcast the contents stored in the memory 104, for example, the main menu 502 as follows, 0: weather, 1:stock, 2:ticket, 3:others. The user enters the graphic user interface shown in FIG. 4, entering or marking 0: weather, and entering the linking address. Thereafter, the steps are done as indicated in FIG. 6. To begin with, similarly, user invokes the corresponding icons that match the attributes of the header in the graphic user interface at 601, then TTS stream or real-time-recorded audio stream is broadcasted at 602. When it comes to state or city, corresponding icons are invoked at 603 and 604 to add voice XML attributes (or voice XML hyperlinks) to them. After the user interacts with the system through the user interface in the above manner, after which the decision is "yes" at decision box 605, the user action recorder records the whole operating procedure of the user at 606, or more specifically, the procedure of invoking icons in the graphic user interface by the user. The voice XML tag generator 102 interprets the action stream and generates the corresponding attributes of voice XML, and voice XML file generator 103 adds corresponding voice XML attributes to TTS stream or real-time-recorded audio stream so as to create the voice XML file.

Figure 7:
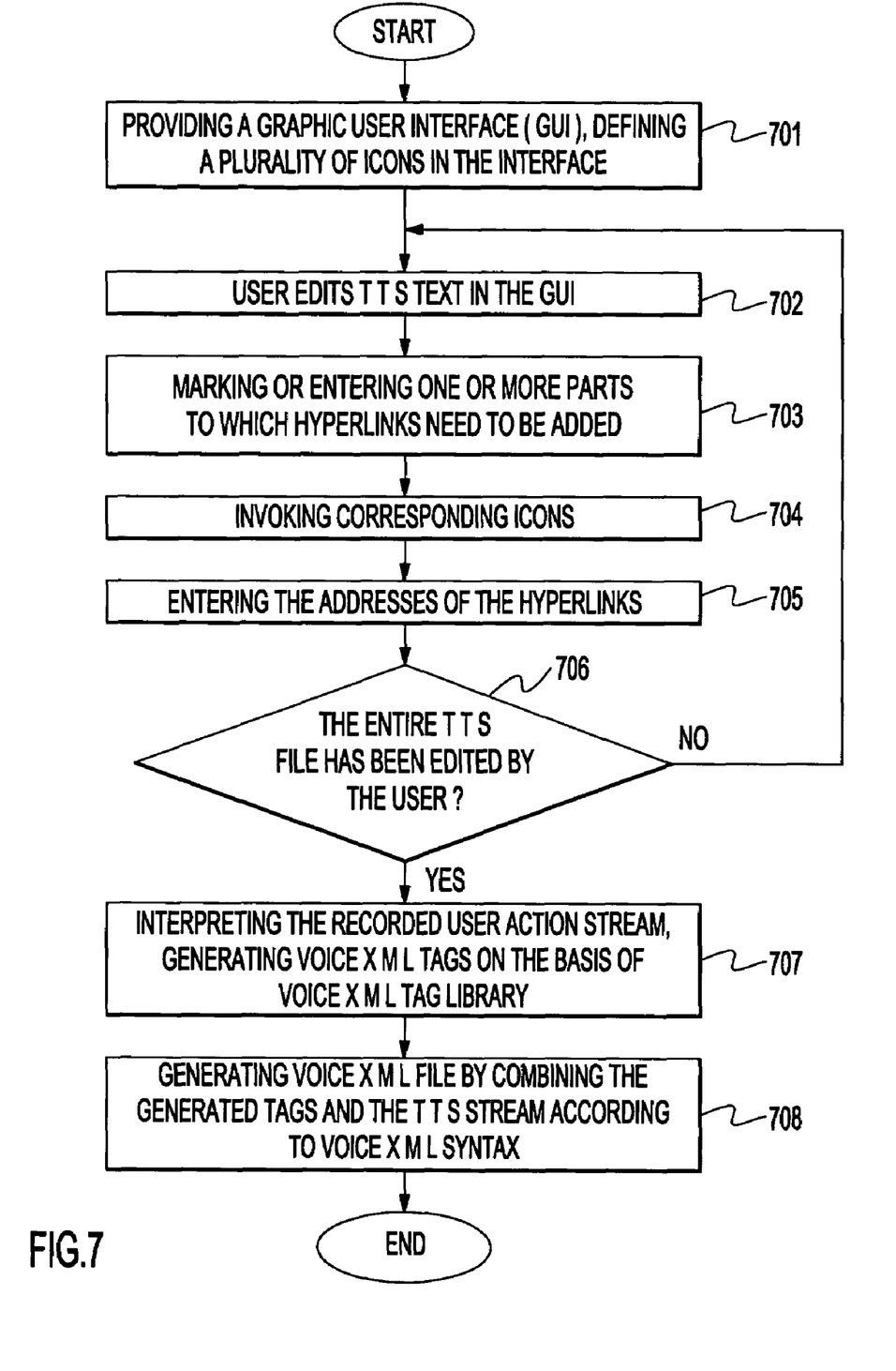
FIG. 7 is a flow chart showing the procedure of adding hyperlinks to TTS voice XML stream according to one preferred embodiment of the present invention.

FIG. 7 is a flow chart showing the procedure of adding hyperlinks to TTS voice XML stream according to one preferred embodiment of the present invention. As shown in FIG. 7, first the graphic user interface is provided at 701, after which the user edits TTS file in the editing area of the graphic user interface at 702, as editing usually HTML files. Then the user enters or marks the parts needed to be added with voice XML hyperlinks at 703, invokes corresponding icons at 704, and enters corresponding hyperlink addresses at 705. Once the entire TTS file has been edited by the user, as determined at decision box 706, the user action stream is interpreted and XML tags generated at 707 and the voice XML file is generated at 708.

Figure 8:
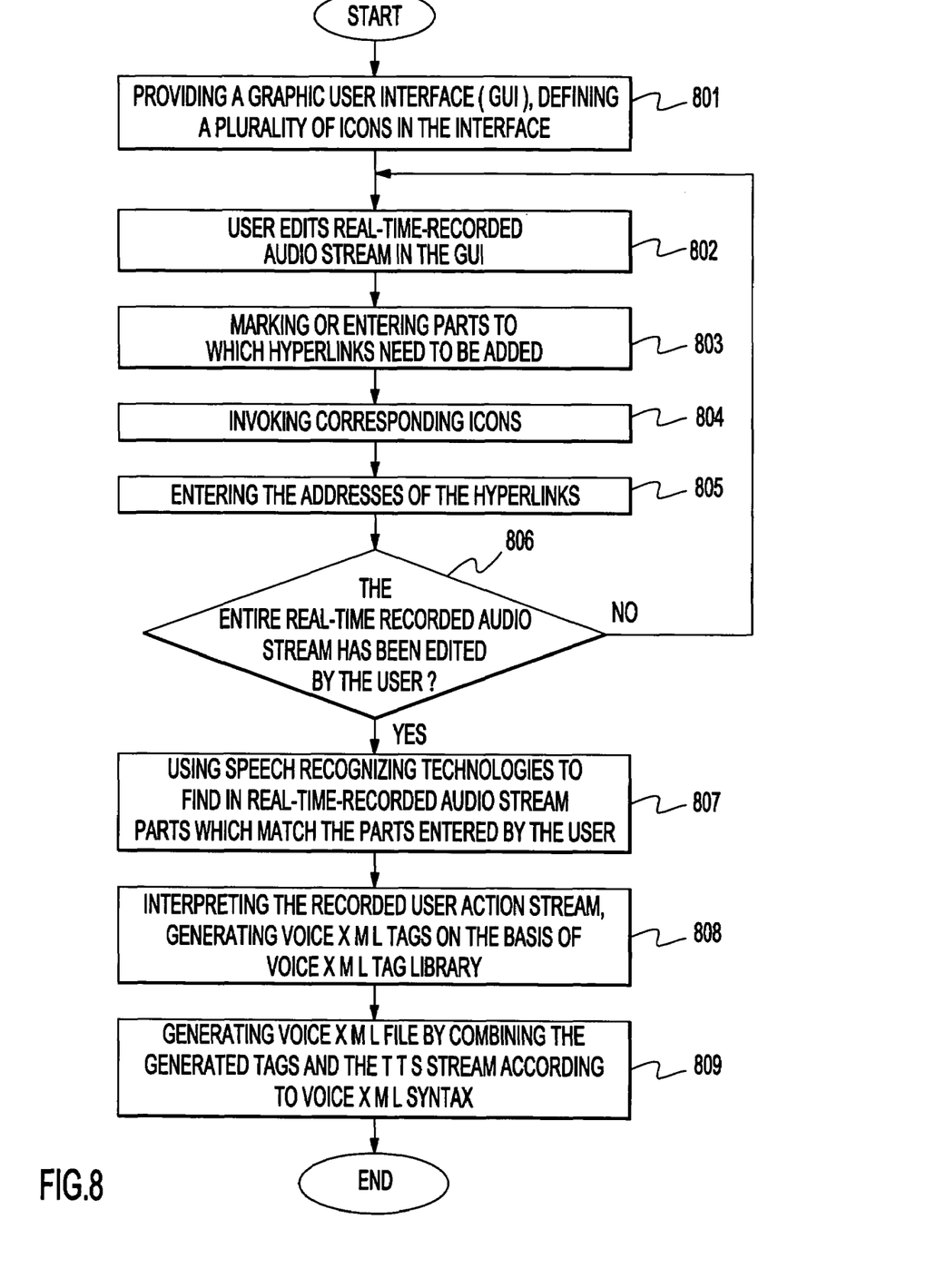
FIG. 8 is a flow chart showing the procedure of adding hyperlinks to real-time-recorded audio voice XML stream according to one preferred embodiment of the present invention.

FIG. 8 is a flow chart showing the procedure of adding hyperlinks to real-time-recorded audio voice XML prompt according to one preferred embodiment of the present invention, wherein when a user enters the parts needed to be added with voice XML hyperlinks in the editing area of graphic user interface, speech recognition technology has to be used to find in real-time-recorded audio stream the parts that match the parts to which voice XML hyperlinks need to be added. As shown in FIG. 8, first the graphic user interface is provided at 801, after which the user edits the real-time-recorded audio stream in the editing area of the graphic user interface at 802, as editing usually HTML files. Then the user enters or marks the parts needed to be added with voice XML hyperlinks at 803, invokes corresponding icons at 804, and enters corresponding hyperlink addresses at 805. Once the entire audio file has been edited by the user, as determined at decision box 806, speech recognition is used to find the audio stream parts which match the parts entered by the user at 807, the stream is interpreted and XML tags generated at 808 and the voice XML file is generated at 809.

The preferred embodiments have been described in conjunction with the accompanying drawings. It is understood by those skilled in the arts that various changes and modifications may be made without departing from the spirit and range of the invention. The invention encompasses all the changes and modifications, and the scope of the invention is only defined by the appended claims.

The invention claimed is:

1. A method for a computer network user for creating a voice XML file automatically, comprising:
providing a graphic user interface (GUI) for defining a plurality of first and second icons, each of said first icons corresponding to one or more attributes of voice XML, and wherein at least one second icon corresponds to a hyperlink to a linkable voice XML file;
receiving user selection input of said icons to edit a content stream displayed in said GUI to customize audio output of said content stream and to add one or more hyperlinks to one or more linkable voice XML files;
recording an action stream of a user invoking said icons in the graphic user interface;
interpreting said action stream based on a library of voice XML tags and generating voice XML tags for said content; and
generating a voice XML file by combining the generated voice XML tags and the content stream including at least one hyperlink to a linkable voice XML file,
wherein, upon listener hyperlink input to the generated voice XML file, audio accessed through said hyperlink is automatically delivered to said listener.

2. The method according to claim 1, wherein said receiving user selection input to add one or more hyperlinks comprises adding the hyperlinks to a content stream comprising a TTS voice XML file by the steps of the user editing the TTS voice XML file in the edit area of said graphic user interface, marking or entering the parts to be added with the hyperlinks, invoking the corresponding icons and entering the corresponding hyperlink addresses.

3. The method according to claim 2, characterized in that when the user marks or enters the same parts to be added with the hyperlinks in the edit area of the graphic user interface for many times and invokes the same hyperlink attributes, the hyperlinks for the whole TTS voice XML stream are batch-added.

4. The method according to claim 1, wherein said receiving user selection input to add one or more hyperlinks to a content stream comprising a real-time-recorded audio voice XML stream by the steps of the user editing the real-time-recorded audio voice XML file in the edit area of said graphic user interface, marking or entering the parts to be added with the hyperlinks, invoking the corresponding icons and entering the corresponding hyperlink addresses, and wherein speech recognition technology is applied to find the parts in the real-time-recorded audio voice XML stream that match the parts entered by the user when interpreting said action stream based on a library of voice XML tags.

5. The method according to claim 4, characterized in that when user marks or enters the same parts to be added with the hyperlinks in the edit area of the graphic user interface for many times and invokes the same hyperlink attributes, the hyperlinks for the whole real-time-recorded audio voice XML stream are batch-added.

6. The method according to claim 1 wherein at least one generated voice XML tag comprises a <prompt bargein=true> tag to allow a listener to interrupt delivery of said generated voice XML file to provide hyperlink input.

7. A system for creating voice XML file automatically, comprising:
a graphic user interface (GUI) for defining a plurality of first and second icons based on network user input, wherein each of said first icons corresponds to one or more attributes of voice XML, and wherein at least one second icon corresponds to a hyperlink to a linkable voice XML file and for receiving user input to edit a content stream displayed in said GUI to customize audio output of said content stream and to add one or more hyperlinks to one or more linkable voice XML files;
a voice XML tag generator for interpreting said action stream based on a library of voice XML tags and generating the corresponding voice XML tags for said content; and
a voice XML file generator for creating the voice XML file by combining the content stream to be played with the tags generated by the voice XML tag generator according to voice XML syntax including at least one hyperlink to a linkable voice XML file, wherein, upon listener hyperlink input to the generated voice XML file, audio accessed through said hyperlink is automatically delivered to said listener.

8. A system according to claim 7, wherein said receiving user selection input to add one or more hyperlinks comprises adding the hyperlinks to a content stream comprising a TTS voice XML stream by the steps of the user editing the TTS voice XML file in the edit area of said graphic user interface, marking or typing the parts to be added the hyperlinks, invoking the corresponding icons and typing the corresponding hyperlink addresses.

9. A system according to claim 8, characterized in that when the user marks or enters the same parts to be added as hyperlinks in the edit area of the graphic user interface component for many times, and invokes the same hyperlinking attributes, said component adds the hyperlinks for the whole TTS voice XML stream.

10. A system according to claim 7, wherein said content stream comprises a real-time recorded audio voice XML stream and wherein said system further comprises a speech recognition engine, said receiving user selection input to add one or more hyperlinks comprises the steps of the user editing the voice XML file in the edit area of said graphic user interface, marking or typing the parts to be added the hyperlinks, invoking the corresponding icons and typing the corresponding hyperlink addresses, and wherein said interpreting said action stream based on a library of voice XML tags further comprises said speech recognition engine finding the parts in the real-time-recorded audio Voice XML stream that match the parts entered by the user.

11. A system according to claim 10, characterized in that when user marks or enters the same parts to be added as hyperlinks in the edit area of the graphic user interface component for many times, and invokes the same hyperlinking attributes, said component adds the hyperlinks for the whole real-time-recorded audio voice XML stream.

12. The system according to claim 7 wherein said voice XML tag generator creates at least one <prompt bargein=true> tag to allow a listener to interrupt delivery of said generated voice XML file to provide hyperlink input.

13. A program storage device readable by machine tangibly embodying a program of instructions executable by said machine to perform method steps for creating a voice XML file automatically, said method comprising the steps of:

providing a graphic user interface (GUI) for defining a plurality of first and second icons, each of said first icons corresponding to one or more attributes of voice XML, and wherein at least one second icon corresponds to a hyperlink to a linkable voice XML file;

receiving user selection input of said icons to edit a content stream displayed in said GUI to customize audio output of said content stream and to add one or more hyperlinks to one or more linkable voice XML files;

recording an action stream of a user invoking said icons in the graphic user interface;

interpreting said action stream based on a library of voice XML tags and generating voice XML tags for said content; and generating a voice XML file by combining the generated voice XML tags and the content stream including at least one hyperlink to a linkable voice XML file, wherein, upon listener hyperlink input to the generated voice XML file, audio accessed through said hyperlink is automatically delivered to said listener.

14. The program storage device according to claim 13, wherein said receiving user selection input to add one or more hyperlinks comprises adding the hyperlinks to a content stream comprising a TTS voice XML file by the steps of the user editing the TTS voice XML file in the edit area of said graphic user interface, marking or entering the parts to be added with the hyperlinks, invoking the corresponding icons and entering the corresponding hyperlink addresses.

15. The program storage device according to claim 14, characterized in that when the user marks or enters the same parts to be added with the hyperlinks in the edit area of the graphic user interface for many times and invokes the same hyperlink attributes, the hyperlinks for the whole TTS voice XML stream are batch-added.

16. The program storage device according to claim 13, wherein said receiving user selection input to add one or more hyperlinks to a content stream comprising a real-time-recorded audio voice XML stream, by the steps of the user editing the real-time-recorded audio voice XML file in the edit area of said graphic user interface, marking or entering the parts to be added with the hyperlinks, invoking the corresponding icons and entering the corresponding hyperlink addresses, and wherein speech recognition technology is applied to find the parts in the real-time-recorded audio voice XML stream that match the parts entered by the user when interpreting said action stream based on a library of voice XML tags.

17. The program storage device according to claim 16, characterized in that when user marks or enters the same parts to be added with the hyperlinks in the edit area of the graphic user interface for many times and invokes the same hyperlink attributes, the hyperlinks for the whole real-time-recorded audio voice XML stream are batch-added.

18. The program storage device according to claim 13, wherein at least one generated voice XML tag comprises a <prompt bargein=true> tag to allow a listener to interrupt delivery of said generated voice XML file to provide hyperlink input.

* * * * *